United States Patent Office 3,046,501
Patented July 24, 1962

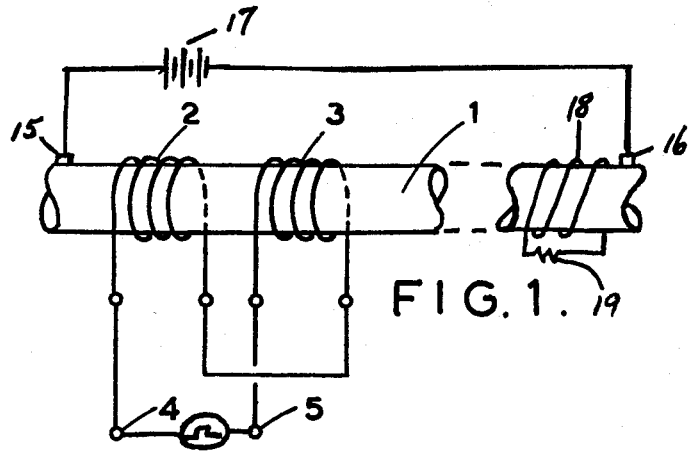
FIG. 1.
FIG. 3.
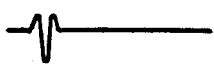
FIG. 3a.
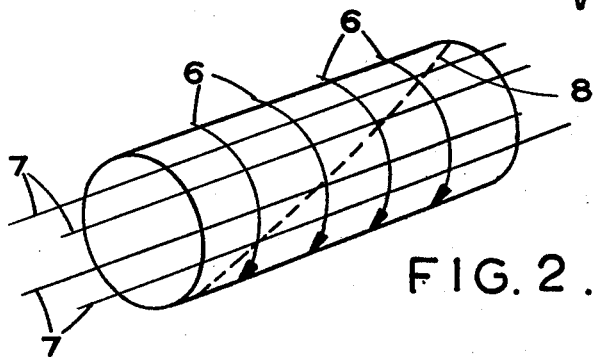
FIG. 2.
FIG. 5.
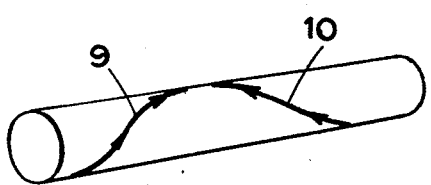
FIG. 4.
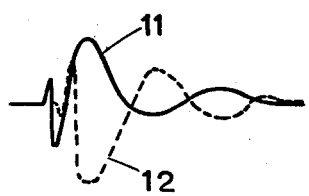
FIG. 5a.
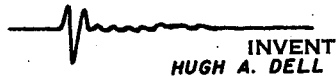
INVENTORS
HUGH A. DELL
MICHAEL A. SNELLING
BY
ATTORNEY

3,046,501
ACOUSTIC SOLID DELAY LINES
Hugh Alexander Dell, Horley, Surrey, and Michael Antony Snelling, Coulsdon, Surrey, England, assignors to North American Philips Company, Inc., New York, N.Y.
Filed Sept. 2, 1958, Ser. No. 758,362
Claims priority, application Great Britain Sept. 3, 1957
6 Claims. (Cl. 333—30)

The invention relates to acoustic solid delay lines and is particularly concerned with magnetostriction transducers therefor operating in a torsional mode.

One delay line of this type has hitherto employed what is known as the "Scarrott-Naylor" system of longitudinal to torsional (and vice versa) mode conversion in which longitudinally excited magnetostrictive members are attached to diametrally opposite sides of the delay line element, usually in the form of a wire, to promote a torsional mode vibration therein. The torsional system can give good results, that is to say the delayed signal suffers little degradation as compared with other propagation modes, but the Scarrott-Naylor arrangement has the disadvantage that positional adjustment of the transducers other than for the purpose of pre-setting is severely restricted. Further, it is difficult to provide transducers in an intermediate position between the transmitting and receiving transducers because acoustic matching difficulties cause unwanted reflections to be set up.

It has also been proposed to generate a torsional mode vibration in a delay line having magnetostrictive properties and being an electrical conductor by passing a current through the line to generate a circumferential flux and arranging a coil co-axial with the line to which the signals to be delayed are supplied. The longitudinal flux set up by signals flowing in the coil acts with the circumferential flux to provide a helical resultant flux in the line which provides, through the magnetostriction effect an acoustic vibration in a torsional mode. This method permits adjustment of the transmitting and receiving transducers and also tapping of the line at any chosen point or points, but it suffers from the disadvantage that the transmitted signal, after a long delay, may be severely degraded.

The object of the intervention is to provide a transducer arrangement which is both adjustable on the delay line and permits tapping of the line and provides an improved signal after long delays.

According to the invention a magnetostriction transducer arrangement for a solid acoustic delay line comprises a pair of coils co-axial with a magnetostrictive member forming part of or attached to the line the coils being adjustably secured adjacent one another and electrically connected together to generate magnetic fluxes of opposite sense when energized and means for generating a circumferential magnetic flux in said member.

Other features of the invention will be apparent from the following description which is given by way of example only with reference to the accompanying drawings in which:

FIGURE 1 shows a transducer arrangement according to the invention,

FIGURE 2 shows diagrammatically the magnetic fluxes and their resultant due to one coil and a current-carrying conductor, FIGURE 3 shows a typical acoustic signal generated in the delay line after a short delay.

FIGURE 3a shows the same signal after a long delay,

FIGURE 4 shows diagrammatically the resultant fluxes due to two coils spaced apart, FIGURE 5 shows the juxtaposition, after a long delay, of the signals due to the two coils and FIGURE 5a shows the resultant signal.

In FIGURE 1 of the drawing is shown a portion of a delay line 1 of an electrically conducting and magnetostrictive material, for example, a nickel wire. Surrounding the wire so as to be co-axial therewith is a pair of coils 2, 3, constituting jointly the input winding, which are so electrically connected together as to generate magnetic fluxes of opposite sense when energised. The signal to be delayed may be applied to the terminal 4, 5 in the form of a pulse. An axial current is passed through the wire 1 by, for example, connection of the ends of the wire at 15 and 16 to a current source 17 which may be a battery.

The resultant flux due to one coil and the current passing through the magnetostrictive member 1 is shown diagrammatically in FIGURE 2. The flux due to the current in the member is a circumferential flux indicated by the lines 6—6, and the flux due to the coil is a longitudinal flux indicated by the lines 7—7. The resultant flux generated in the magnetostrictive member is therefore a helical flux shown by the dotted line 8.

If with such a single coil arrangement a pulse is applied to the coil a typical acoustic signal magnetostrictively generated in the line will appear, after a short delay, as shown in FIGURE 3. After a long delay, however, the signal may have acquired the form shown in FIGURE 3a. These waveforms are those obtained by displaying on an oscilloscope the signals picked up by single coil receiving transducers positioned (a) close to the transmitting transducer and (b) at a distance along the delay line.

Since in the arrangement according to the invention two coils are used situated closely adjacent one another and acting in opposition the effect produced will now be described with reference to FIGURES 4, 5 and 5a.

FIGURE 4 shows diagrammatically the resultant fluxes 9, 10, produced in the magnetostrictive member due to the coils and the current flowing in the member. The signal produced by the flux 10 after a long delay (for the same kind of input signal as shown in FIGURE 3), which may be derived in an output winding 18 coupled to a suitable lead 19, is shown as curve 11, in FIGURE 5. The signal produced by the flux 9 after the same long delay is shown as curve 12. It will be noted that due to the physical separation of the two coils producing the fluxes 9 and 10, the one lags behind the other. The resultant acoustic signal operative on a receiver transducer causes this receiver to produce an output signal (after long delay) of the form shown in FIGURE 5a. It will be seen that this received signal is almost identical with that obtained after a short delay (FIGURE 3) and the pulse form is readily identifiable from the general "noise" level even after long delay. The resolution of the system is therefore improved in two important respects namely, (a) the pulse duration is more nearly independent of delay time and (b) the waveform shape is similarly more nearly independent of delay time.

The invention is not limited to the embodiment shown diagrammatically in FIGURE 1. For example the circumferential flux produced by passing a current through the magnetostrictive member may be obtained instead by winding a toroidal coil on each of the coils 2, 3. In this case the signal to be delayed may be applied to the toroidal coils and a unidirectional current passed continuously through the coils 2, 3. This latter current may itself, if desired, be pulsed simultaneously with the signal current.

Further where the material of the delay line is not magnetostrictive, a sleeve of magnetostrictive material for example a ferrite material may be attached to the line as by an adhesive for example an epoxy resin.

It will be understood that the transducer arrangement above described may be used not only for transmitting an acoustic wave but also for receiving it. Also it will be apparent that when the delay line is of magnetostrictive material tapping of the line at any point can be effected with ease since it is only necessary to place a pick-up coil or coils at the desired place. Naturally such pick-up coil or coils may be continuously adjustable along the line. In order to obtain the optimum resolution the coils forming a transducer may be so mounted that they may be adjusted in position relative to each other.

What we claim is:

1. An acoustic delay line comprising a magnetostrictive member having a longitudinal axis, input means to said line comprising a pair of axially-adjacently-mounted coils surrounding the magnetostrictive member and wound and electrically-interconnected to generate in the magnetostrictive member oppositely-axially-directed magnetic flux when excited by an input signal, means coupled to said magnetostrictive member for generating a circumferential magnetic flux therein, and output means coupled to said magnetostrictive member for deriving an output signal corresponding to the input signal but delayed in time.

2. A device as set forth in claim 1 including means for supplying signal pulses to said coils.

3. A device as set forth in claim 1 wherein the magnetostrictive member is electrically conducting, and the circumferential flux generating means comprises a source of potential coupled to the line for passing an axial current therethrough.

4. A device as set forth in claim 1 wherein the circumferential flux generating means comprises toroidal coils wound on the pair of coils.

5. An acoustic delay line comprising a magnetostrictive member having a longitudinal axis, input means to said line comprising a pair of adjustable, axially-adjacently-mounted coils surrounding the magnetostrictive member and wound and electrically-interconnected to generate in the magnetostrictive member oppositely-axially-directed magnetic flux when excited by an input signal, means coupled to said magnetostrictive member for generating a circumferential magnetic flux therein, and output means adjustably coupled to said magnetostrictive member for deriving an output signal corresponding to the input signal but delayed in time whereby pulse duration of said input signal and the wave form shape of the input signal is made substantially independent of delay time.

6. A device as set forth in claim 5 wherein the magnetostrictive member is in the form of a sleeve.

References Cited in the file of this patent

UNITED STATES PATENTS

| | | |
|---|---|---|
| 2,526,229 | Hazeltine | Oct. 17, 1950 |
| 2,696,590 | Roberts | Dec. 7, 1954 |
| 2,709,243 | Babcock | May 24, 1955 |
| 2,736,824 | Roberts | Feb. 28, 1956 |
| 2,760,165 | Sullivan | Aug. 21, 1956 |
| 2,876,419 | Gianola | Mar. 3, 1959 |

FOREIGN PATENTS

| | | |
|---|---|---|
| 758,647 | Great Britain | Oct. 10, 1956 |